3,395,983
PROCESS FOR THE PREPARATION OF IRON OXIDE
Leonard M. Bennetch, Bethlehem, Pa., assignor to Chas. Pfizer & Co., Inc., New York, N.Y., a corporation of Delaware
No Drawing. Filed Sept. 17, 1965, Ser. No. 488,250
5 Claims. (Cl. 23—200)

ABSTRACT OF THE DISCLOSURE

Increased yields of ferric oxide are obtained by heating a ferrous salt and metallic iron in the presence of a hydrated ferric oxide seed slurry while maintaining a pH of 3–4½ by interadjusting the respective rates of addition of ammonia gas and an oxygen containing gas.

---

This invention relates to the production of ferric oxides and more particularly to an improved process for the production of ferric oxides and their hydrates which comprises oxidizing metallic iron and water-soluble ferrous salts to ferric oxide in the presence of water and in the presence of a minor amount of hydrated ferric oxide by the action of air and ammonia. The process of this invention is particularly suitable for the production of pigmentary ferric oxide and ferric oxide hydrates.

The iron oxide compounds produced by the process of this invention are well known articles of commerce. They are used not only for pigmenting paints and lacquers, but also in rubber, plastic, paper, cement, emulsions, plaster and in cosmetics. They are used in the production of catalysts, magnetic and electronic components and in polishing compounds. For these purposes, control of particle size, and color is required, particularly for pigment applications where reproducible hiding power, tinctorial strength and color tone are essential. The process of this invention yields yellow and red ferric oxides of high quality and purity in uniform particle size of excellent color and color strength.

The process of this invention allows the production of ferric oxide and ferric oxide hydrates at a higher production rate and thus, more economically than heretofore possible. The oxidation and precipitation processes of this invention are conducted in the presence of a starting slurry of a hydrated ferric oxide present in minor amounts. If a yellow ferric oxide hydrate slurry is employed, a yellow oxide will be produced analyzing 86.5 to 88.5% $Fe_2O_3$. If a red oxide slurry is used, a red oxide analyzing 96 to 99% $Fe_2O_3$ will be formed. Both the red and yellow oxides produced by the process of this invention have excellent color shades and are of fine uniform particle size in the range of about 0.25 to 5 microns. When the process of this invention is of short duration, such as for 2 or 3 days, a light shade of the red or yellow oxide is produced. Longer processing yields progressively deeper shades such as dark orange and purple colors of the larger particle size oxide hydrates.

Yellow iron oxides can be made in the presence of a seed slurry as disclosed in U.S. Patent No. 2,939,767 to John Martin by the oxidation of a ferrous salt solution by means of anhydrous ammonia and a free-oxygen containing gas. In U.S. Patent No. 2,388,659 to Lonnie W. Ryan and Herbert L. Sanders, a method for the production of yellow iron oxides is disclosed which comprises the alkaline precipitation of hydrated iron oxide produced by the oxidation of ferrous salts by air in the presence of a seed slurry of hydrated ferric oxide. The preparation of a red iron oxide is disclosed in U.S. Patent No. 2,785,991 to Leonard M. Bennetch by oxidizing iron with air in the presence of a ferrous salt solution and a red hydrated ferric oxide seed slurry. The process of this invention contemplates the production of ferric oxide by oxidation of a ferrous salt solution and the oxidation of metallic iron, in the presence of a minor amount of a slurry of hydrated ferric oxide, by the action of air and ammonia. The process of this invention offers important advantages over the above-mentioned prior art in that I have obtained an unobvious and unpredictable increase in yield which would not be apparent in considering the combination of yields from a process employing the oxidation of ferrous salts in the presence of a seed slurry of hydrated ferric oxide, by the action of oxygen and anhydrous ammonia, and a process employing the oxidation of metallic iron by heating and oxidizing an aqueous ferrous salt solution in the presence of metallic iron as disclosed in U.S. Patent No. 1,327,061 to R. S. Penniman and N. M. Zoph.

The process of this invention makes possible greatly increased yields from plant production facilities. For example, tests in five commercial yellow oxide production tanks, each in excess of 10,000 gallons capacity, using the process of this invention, averaged 42.5% greater yield over five tanks operating under the same conditions using the metallic iron oxidation process. Of this greater product yield, 12% was due to the stoichiometric yield from the oxidation of the ferrous salt by air and ammonia as measured by the salt and ammonia consumed. The balance of the increased yield, 30.5%, was due to the unexpected potentiating effect of the ammonia on the oxidation of iron.

Another advantage of this invention is a greater tank slurry fluidity or mobility for any given solid concentration which improves mixing and circulation of tank liquids and thereby improves the production rate and lowers processing costs. Moreover, since shade development is faster by the process of this invention, the processing time to reach a given commercial shade is reduced by up to 50%, making possible more finished tank batches in a given time than possible with former commercial processes. Still another advantage of this invention is the preparation of products of increased purity over the processes of the aforementioned patents, due in part to the less acidic conditions of the tank and also to the use of proportionately less metallic iron. The metallic iron of the commercial processes is usually scrap iron, a commodity which fluctuates in quality and which can adversely affect the purity of the oxide made therefrom. Another very important advantage of this invention lies in the ammonia neutralization aspect wherein the iron salt concentration in the final tank slurry is lowered, thereby lowering the processing cost and decreasing the pollution hazard of process effluent.

While the above advantages of this invention apply to both yellow and red oxide production, in the latter case, it is observed that the overall increase in productivity is proportional to the amount of ammonia used. This invention has demonstrated a 21 to 30% greater rate of production of red oxide compared to the oxidation process when scrap iron is used alone under the same conditions.

A specific embodiment of the process of this invention as it relates to the production of yellow ferric oxide comprises adding a minor amount of a yellow ferric oxide seed slurry prepared by any method and preferably prepared by precipitating ferrous hydroxide from an aqueous ferrous salt solution with alkali and oxidizing said ferrous hydroxide with air.

For the preparation of a red oxide by the process of this invention, a red oxide seed slurry is prepared in the same manner and incorporated into this process. The previously prepared seed slurry is added to a 15,000 gallon processing tank of about 12,000 gallon operating volume. The amount of seed oxide is not critical in the process of this invention. It is well known to those skilled in the art that a greater concentration produces a lighter colored product and a lesser concentration produces a darker product. An intermediate range is one wherein the concentration of seed is in the range of about 0.1 to 0.3 pound per gallon based on the total reaction mixture volume. To the seed slurry is added an aqueous ferrous salt solution. The ferrous salt can be any water-soluble ferrous salt such as ferrous chloride, ferrous sulfate or ferrous acetate. Ferrous sulfate, copperas, is preferred because of its low cost and availability. A range of from about 0.5 to 1.0 pound per gallon based on the total operating volume is preferred on the basis of process control and economy. While other concentrations are effective, less than the preferred range decreases the reaction rate and more than the preferred range is uneconomical since unreacted ferrous salt is obtained in the processing effluent. To the mixture of ferrous salt solution and seed slurry is added scrap iron. The amount of scrap iron is also not critical. However, we have found a range of about 2 to 6 tons for a processing tank of 12,000 gallons operating volume to be an economical range. The tank slurry temperature is adjusted to from about 150 to 200° F. and preferably about 175° F. by any heating means. In usual practice, steam coils in the tank are used. Air and ammonia gas are introduced through separate sparge rings in the tank at such a rate as to maintain the acidity of the reaction mixture at a pH of from about 3 to 4.5 and preferably at about pH 4.0. The pH of the process slurry may be adjusted higher by decreasing the volume of air or by increasing the amount of ammonia. While air is the most convenient gas to use, pure oxygen, oxygen-enriched air and other oxygen-containing gases may be used effectively in the process of this invention. The ammonia of this invention is preferably in the form of ammonia gas. However, ammonia in aqueous solution or anhydrous liquid ammonia may also be effectively used. As the process is continued, the yield is monitored by analysis of the tank slurry. Additional scrap iron and ferrous salt are added to maintain production and to prevent raw materials becoming exhausted. The process is shut down when the desired shade of oxide is obtained. A medium red oxide shade is obtained by using a red oxide seed slurry by the process of this invention in about 100 hours. The product is collected by the usual rotary vacuum filtration, washing and conveyor drying. Other methods for collecting, filtering and drying are well known to those skilled in the art.

The following examples further illustrate this invention. They are not to be construed as limiting the scope thereof. On the contrary, it is to be understood that resort may be had to various other embodiments, modifications, and equivalents thereof which readily suggest themselves to those skilled in the art without departing from the spirit of the present invention and/or the scope of the appended claims.

Example I.—Yellow iron oxide

Into a 15,000 gallon processing tank of 12,000 gallon operating volume are added 4,000 gallons of a yellow oxide seed slurry containing 2,400 pounds of hydrated oxide and 8,000 gallons of a ferrous sulfate solution containing 6,000 pounds of ferrous sulfate. To the mixture are added 3 tons of scrap iron. The tank slurry temperature is raised to 175° F. by means of steam coils and ammonia at 3 cu. ft./min. and air at 150 cu. ft./min. are introduced through separate sparge rings. The acidity is pH 3.3 and is maintained at this level by adjustment of the air and ammonia input during the processing run. The process is run for 8 hours and the product is filtered from the reaction mass, washed with 100 gallons of water, refiltered and dried at 110° C. The yield is 4,400 pounds of yellow oxide.

Example II.—Red iron oxide

Into a 10-liter laboratory processing tank equipped with a scrap iron chamber, mechanical stirrer, air sparger and an ammonia inlet are added 1,200 grams of scrap iron, 8.5 liters of seed slurry containing 120 grams of red iron oxide seed and 520 grams of copperas $(FeSO_4 \cdot 7H_2O)$ The batch is stirred, heated to 185° F. with a steam coil, air is bubbled in at a rate of 400 ml. per minute and ammonia is bubbled in at a rate of 36 ml. per minute to give a pH of 4. During 75 hours processing time, an additional 1,000 grams copperas is added for a total of 1,520 grams. At the end of the reaction time, 250 grams of copperas remain unused in the slurry as well as 360 grams of scrap iron. The product is filtered, washed with 1,000 ml. of water and dried. The yield is 1,620 grams of medium shade red oxide assaying 98.3% $Fe_2O_3$. The same vessel operating under similar conditions but using scrap iron and the red oxide seed slurry without ammonia runs at pH 3.1 and produces 1,050 grams of red oxide of a light shade assaying 95% $Fe_2O_3$ in 75 hours.

Example III.—Yellow iron oxide

Into a 10-liter laboratory processing tank equipped with a scrap iron chamber, a mechanical stirrer, air sparger and an ammonia inlet are added 8.5 liters of a yellow oxide seed containing 150 grams of colloidal, hydrated ferric oxide. Sufficient copperas is added to obtain a total concentration of 60 grams per liter. To the mixture are added 1150 grams scrap iron. The temperature is adjusted to 150° F. For 43 hours a synthetic mixture of 10% oxygen gas and 90% nitrogen is bubbled into the mixture at an average rate of 675 ml. per minute and ammonia is bubbled in at an average rate of 57.5 ml. per minute. The processing acidity is maintained at pH 4.5 by adjustment of the air and ammonia rates. The product is filtered, washed with 1500 ml. water and dried at 110° C. The yield is 1420 grams of a medium shade of yellow oxide assaying 88.05% $Fe_2O_3$. The same vessel similarly operated without ammonia, produced 1320 grams of yellow oxide of a medium shade assaying 87.3% $Fe_2O_3$ in 70 hours.

Example IV.—Red iron oxide

Into a 20-gallon processing tank, having no mechanical agitation but fitted with an air dispenser pipe, ammonia jet and a scrap iron compartment, are pumped 17 gallons of red iron oxide slurry containing 2.2 pounds of red colloidal, hydrated seed oxide. Copperas is added during the run to maintain a concentration of 0.25 pound per gallon. The temperature is adjusted to 200° F. and 8¾ pounds of scrap iron are placed in the iron compartment. For a period of 100 hours, an average of 25 cu. ft./hour of air and 0.25 cu. ft./hr. of ammonia are bubbled into the tank to maintain a pH of 3.4. After filtering, washing with 3 liters of water and drying the product at 250° F., a total of 11.5 pounds of a medium shade of red iron oxide, assaying 98.6% $Fe_2O_3$ is obtained. Of this product, about two pounds are calculated to be from the oxidation of the ferrous salt and precipitation by ammonia and the remaining 9.5 pounds are derived through the oxidation of the scrap iron. Using this same vessel without ammonia, a yield of 11.5 pounds of a slightly lighter shade of red oxide analyzing 98.6% $Fe_2O_3$ is obtained in 127 hours. From these figures it can be calculated that the process of this invention has a 27.5% greater hourly oxide production rate than the usual process.

Example V.—Yellow iron oxide

In a 10-liter laboratory processing tank equipped with a scrap iron chamber, a mechanical stirrer and air sparger are added 8.5 liters of a yellow oxide seed containing 150 grams of colloidal, hydrated ferric oxide of goethite structure in water. Sufficient ferrous chloride is added to obtain a total concentration of 60 grams per liter. To the mixture are added 1150 grams scrap iron. The temperature is adjusted to 180° F. For 43 hours a synthetic mixture of 10% oxygen and 90% nitrogen is bubbled into the reaction slurry at an average rate of 675 ml. per minute and a concentrated aqueous ammonia solution (15 N) added at the rate of about 9.6 ml. per hour. The processing acidity is maintained at pH 4.0 by adjustment of the air and ammonia rates of addition. The product is filtered, washed with 1500 ml. water and dried at 110° C. The yield is 1400 grams of a medium shade of yellow oxide, assaying 88% $Fe_2O_3$.

Example VI.—Red iron oxide

Into a 10-liter laboratory processing tank equipped with a scrap iron chamber, mechanical stirrer and air sparger are added 1200 grams scrap iron, 8.5 liters of a seed slurry containing 120 grams of red iron oxide of hematite structure and 510 grams of ferrous acetate. The batch is stirred, heated to 185° F. with a steam coil, air is bubbled in at a rate of 400 ml. per minute and liquid anhydrous ammonia is added at the rate of 1.5 grams per hour to give a pH of 4.4. During 75 hours processing time, an additional 1000 grams of ferrous acetate is added for a total of 1510 grams. The product is filtered, washed with water, re-filtered and dried. The yield is about 1600 grams of red oxide.

What is claimed is:

1. A process for producing ferric oxide and ferric oxide hydrates which comprises heating at a temperature of from about 150° F. to about 200° F., a ferrous salt and metallic iron in an aqueous system containing a minor amount of hydrated ferric oxide while maintaining the pH at between about 3 and about 4½ by the controlled addition of ammonia gas and of an oxygen-containing gas.

2. A process according to claim 1 wherein the ferrous salt is ferrous sulfate.

3. A process according to claim 1 wherein the pH of the mixture is within the range of about 3 to 4.

4. A process according to claim 1 wherein the minor amount of hydrated ferric oxide is a red iron oxide.

5. A process according to claim 1 wherein the minor amount of hydrated ferric oxide is a yellow iron oxide.

References Cited

UNITED STATES PATENTS

| | | | |
|---|---|---|---|
| 2,388,659 | 11/1945 | Ryan et al. | 23—200 |
| 2,574,459 | 11/1951 | Bennetch | 23—200 X |
| 2,785,991 | 3/1957 | Bennetch | 23—200 |
| 2,866,686 | 12/1958 | Bennetch | 23—200 |
| 2,939,767 | 6/1960 | Martin | 23—200 |

OSCAR R. VERTIZ, *Primary Examiner.*

G. T. OZAKI, *Assistant Examiner.*